(12) United States Patent
Kewitsch

(10) Patent No.: US 7,460,753 B2
(45) Date of Patent: Dec. 2, 2008

(54) SHAPE-RETAINING FIBER OPTIC CABLES HAVING LIMITED BEND RADIUS

(76) Inventor: Anthony Stephen Kewitsch, 515 Ocean Ave. Unit 505-South, Santa Monica, CA (US) 90402

( * ) Notice: Subject to any disclaimer, the term of this patent is extended or adjusted under 35 U.S.C. 154(b) by 0 days.

(21) Appl. No.: 11/467,164

(22) Filed: Aug. 25, 2006

(65) Prior Publication Data

US 2008/0008430 A1 Jan. 10, 2008

Related U.S. Application Data

(60) Provisional application No. 60/819,306, filed on Jul. 6, 2006.

(51) Int. Cl.
*G02B 6/44* (2006.01)
(52) U.S. Cl. .................. 385/113; 385/100
(58) Field of Classification Search ............ None
See application file for complete search history.

(56) References Cited

U.S. PATENT DOCUMENTS

| | | | | |
|---|---|---|---|---|
| 3,766,374 A | * | 10/1973 | Fairchild | 362/567 |
| 4,705,352 A | * | 11/1987 | Margolin et al. | 385/81 |
| 5,386,489 A | * | 1/1995 | Stokes | 385/100 |
| 6,169,834 B1 | * | 1/2001 | Keller | 385/101 |
| 6,256,438 B1 | * | 7/2001 | Gimblet | 385/109 |
| 2005/0013565 A1 | * | 1/2005 | Mohler et al. | 385/113 |

* cited by examiner

*Primary Examiner*—Sung H Pak
*Assistant Examiner*—Mike Stahl
(74) *Attorney, Agent, or Firm*—Raymond Bogucki

(57) ABSTRACT

In accordance with this invention, fiber optic cables are provided whose shape may be formed and retained while maintaining a limited bend radius. These features are produced by incorporating a compact compliant internal cable member into the cable structure. The compliant internal member consists not only of the fiber optic cable, but also of ductile and non-ductile elements. The ductile element is advantageously a tube or a wire which readily deforms to retain a given shape, and may be reshaped if desired. The non-ductile element, which resists sharp bending of the cable during shaping, comprises a substantially non-ductile elongated element disposed within the cable and configured to oppose excessively sharp bending along its length. Proper selection of the cross-sections and materials used in these elongated members produces a proper balance between shape retention and bending radius.

15 Claims, 9 Drawing Sheets

SHAPE-RETAINING FIBER OPTIC CABLES HAVING LIMITED BEND RADIUS

REFERENCE TO RELATED APPLICATIONS

This disclosure claims priority on U.S. Provisional Application No. 60/819,306 entitled "Shape-Retaining Fiber Optic Cables Using a Compliant Insert" by A. Kewitsch and filed on Jul. 6, 2006.

FIELD OF THE INVENTION

This invention relates to interconnects using fiber optic cables to transmit illumination and/or signals, and more particularly to shape-retaining and bend radius limited fiber optic patch cords.

BACKGROUND OF THE INVENTION

The development of improved techniques to interconnect and deliver optical power and signals in optical fiber systems is of growing importance as optical fiber technologies spread to various telecommunications, networking, industrial and medical applications. A unique characteristic of fiber-based transmission media is that considerable care must be taken in handling fiber optic cables because of the potential to damage the internal glass optical fiber. Unlike most electrical cables, which can be sharply bent or subjected to significant forces without impacting their performance characteristics, fiber optic cables are readily damaged under small shear forces and must maintain greater than a minimum bend radius. Sharp bends result in increased insertion loss, stress birefringence and ultimately fiber failure. In addition, the interface between the polished fiber optic connector and cable is susceptible to damage arising from the concentration of stress at the point the cable enters the connector body.

The preparation of fiber optic patchcords requires the use of a polishing process which adds cost relative to electronic cabling. Optical fiber cables can not be readily cut to length in the field, nor can they be folded to take up excess length. Optical connectors are also highly susceptible to contamination or scratching. This damage results in potential data corruption or complete loss of data transmission. Therefore, techniques and cable designs to mitigate damage to fiber optic cables address an important problem.

Various fiber optic cable designs have been disclosed that armor and isolate the delicate optical fiber from damage. For example, U.S. Pat. No. 6,233,384 by Sowell et al. discloses a crush, kink and torque resistant flexible fiber optic cable having a spiraled, rigid, metal wire layer circumferentially disposed around the cable. The prior art has also disclosed optical fibers with shape memory activated by the application of heat to the cable, for example, as in Japan Patent Application JP2000338373. In this disclosure, a shape memory alloy ribbon is coated on the outside of the optical fiber, which can spring into a predetermined shape by application of heat. In the art of suspended optical fiber cables, it is common practice to spiral optical fiber elements about a metallic "tension member" which supports the cable to prevent the optical fibers from being tensioned excessively. Such tension members are typically braided wire, which do not have appropriate mechanical characteristics to enable the cable to retain a shape.

Japanese patent JP59187303 describes an optical fiber which is plated or evaporated with a thin metal layer to retain a bend. However, this approach does not provide a means of limiting the bend radius in the bent state. An alternate approach to mechanically support a fiber optic bundle and retain its shape is described in U.S. Pat. No. 5,879,075 by Conner et al. This segmented, metallic gooseneck design is used for large diameter fiber bundles. These factors make such a cable impractical for most applications, which require a solution that satisfies multiple requirements including low cost, light weight and small form factor.

SUMMARY OF THE INVENTION

In accordance with this invention, fiber optic cables are provided whose shape may be formed and retained while maintaining an acceptable bend radius. These features are produced by incorporating a compact compliant internal cable member into the cable structure. The compliant internal member consists not only of the fiber optic cable, but also ductile and non-ductile elements. The ductile element is advantageously a tube or a wire which readily deforms to retain a given shape and may be reshaped if desired. The non-ductile element, which resists sharp bending of the cable during shaping, comprises a substantially non-ductile elongated element disposed within the cable and configured to oppose excessively sharp bending radius along its length. Proper selection of the cross-sections and materials used in these elongated members produces a proper balance between shape retention and bending radius.

In a specific example of a bendable fiber optic structure in accordance with the invention, the ductile element comprises a soft annealed copper or other soft metal tube and the non-ductile element is, for example, spring tempered steel. In one example, elements have outer diameters of 2 mm or less and are disposed, together with the optical fiber within a longitudinally yieldable jacket that assures longitudinal interaction between the elements.

It is shown that selection of appropriate cross-sections, dimensions, and materials can be used to define a shape-retaining structure with a defined minimum bend radius. Through an analytical or iterative process, the dimensions of the ductile material and the non-ductile element, and their elasticity properties, can be adjusted to limit the minimum bending radius while permitting arbitrary shaping within predetermined limits.

A number of variations of cables using this approach are shown, including duplex and simplex cables, with the optical fibers, ductile elements and non-ductile elements being arranged in different configurations. In one example the shape of the non-ductile element is configured to limit the bending radius.

DETAILED DESCRIPTION OF THE INVENTION

In this invention, we disclose shape-retaining and kink-resistant optical fiber cables incorporating one or more internal compliant members. The compliant member is comprised of a deformable element which can be shaped and holds a desired longitudinal cable configuration, and a non-ductile element which prevents excessively sharp bends of the resulting shaped cable.

Figure 1:
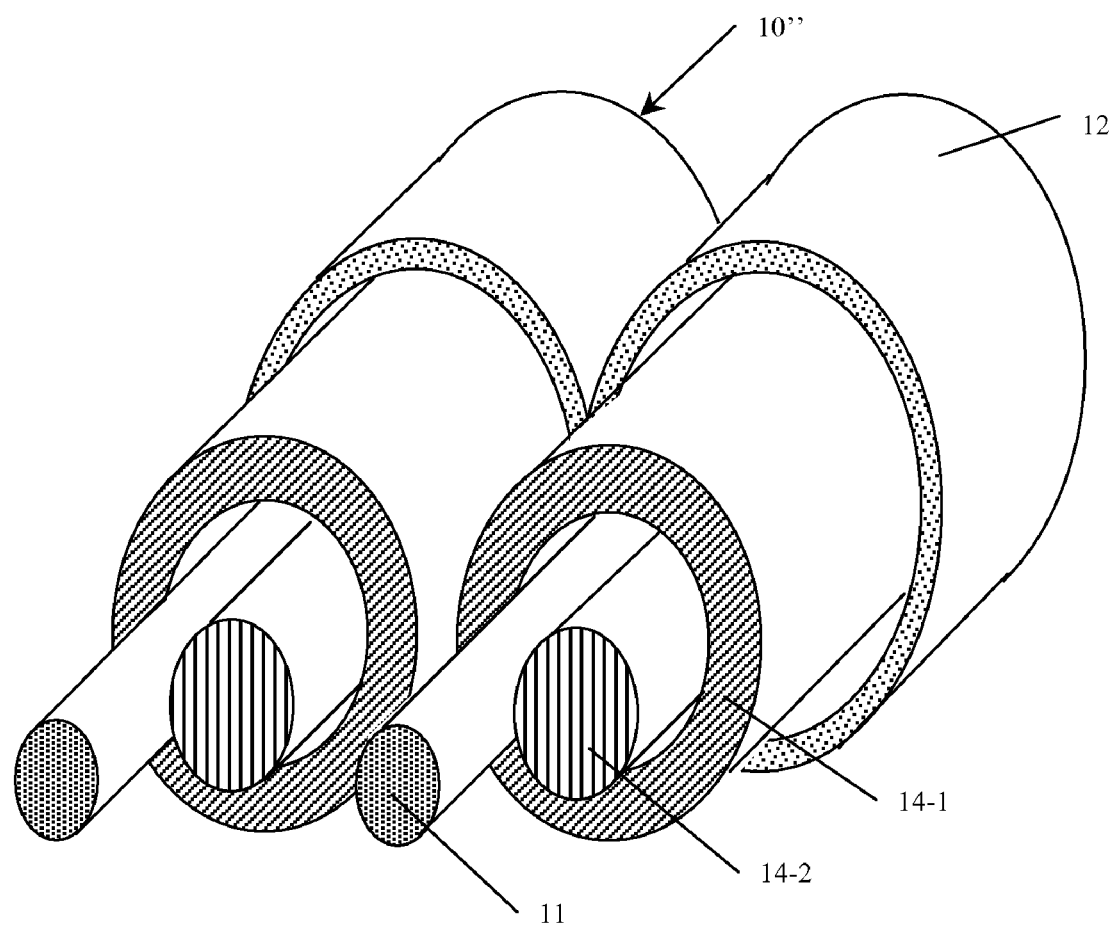
FIG. 1 illustrates a partial cutaway, perspective view of a duplex fiber optic patchcord.

In a first example (FIG. 1), the compliant members are internal to a duplex, fiber optic patch cord for Gigabit Ethernet systems with 3 mm by 6 mm zipcord jacket dimensions. "Zipcord" refers to the style of cable wherein the twin cable elements of the duplex cable can be readily separated into individual cables by separating at an end and pulling apart. Such a cable is illustrated in a partial cutway, prespective view in FIG. 1. The duplex cable 10" is comprised of optical fibers 11, ductile elements 14-1 in the form of tubes surrounding the optical fibers 11, and non-ductile elements 14-2 in the form of solid wires. These elements are contained within the twin cavities of the cable jacket 12.

In this example, the non-ductile elements 14-2 are internal to the cylindrical ductile elements 14-1 and longitudinally adjacent. The ductile element 14-1 is a soft annealed copper tube with outer diameter of 2 mm and inner diameter of 1.25 mm. The non-ductile element 14-2 is spring tempered high carbon steel of 0.787 mm diameter. The outer diameter of jacket 12 is 3.0 mm and its inner diameter is 2.5 mm. The jacket is typically fabricated of flexible polyvinyl chloride (PVC) with 3 mm outer diameter. The optical fibers 11 are 0.125 mm diameter glass fibers with core diameters in the range of 5 to 100 microns and protected with a 0.250 mm diameter acrylate coating.

Figure 2A:
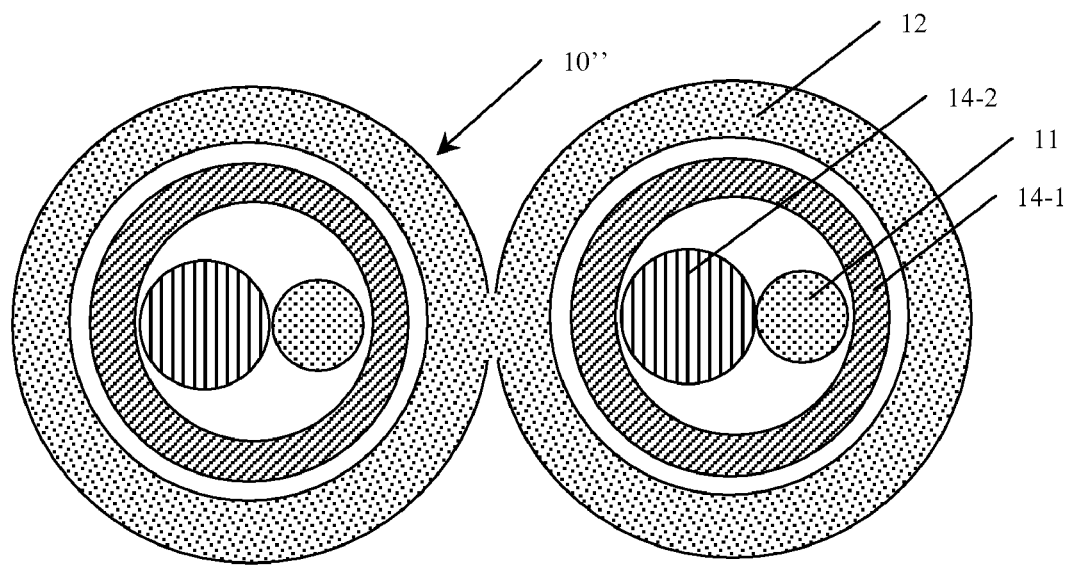
FIG. 2 illustrates cross sectional views of the shape-retaining duplex fiber optic patchcords comprised of opposed ductile and non-ductile elements.
Figure 2B:
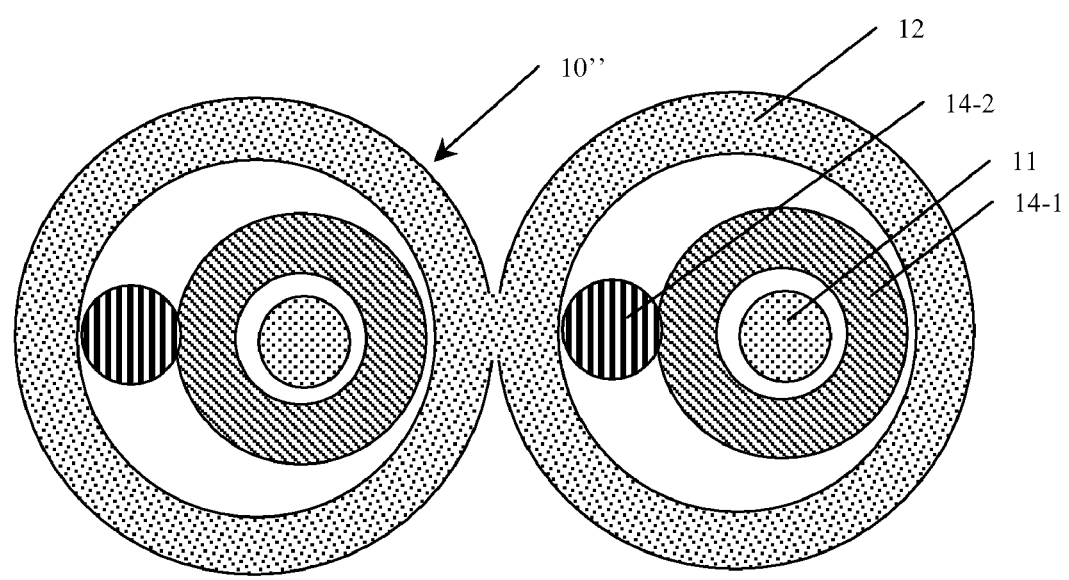

FIG. 2 illustrates cross sectional views of typical duplex shape retaining cables. In the example of FIG. 2A, the non-ductile element 14-2 is surrounded by the ductile element 14-1. Alternately, as shown in FIG. 2B, the non-ductile elements 14-2 are located outside of and longitudinally adjacent to ductile tube 14-1 with little or no impact on the performance of the compliant member. In this latter configuration, the jacket 12 serves to retain the adjacent, opposing ductile and non-ductile elements along the longitudinal extent of the cable, whereby the jacket wall thickness and strength are adequate to maintain the longitudinal alignment and transfer of forces between these elements upon bending.

Figure 3:
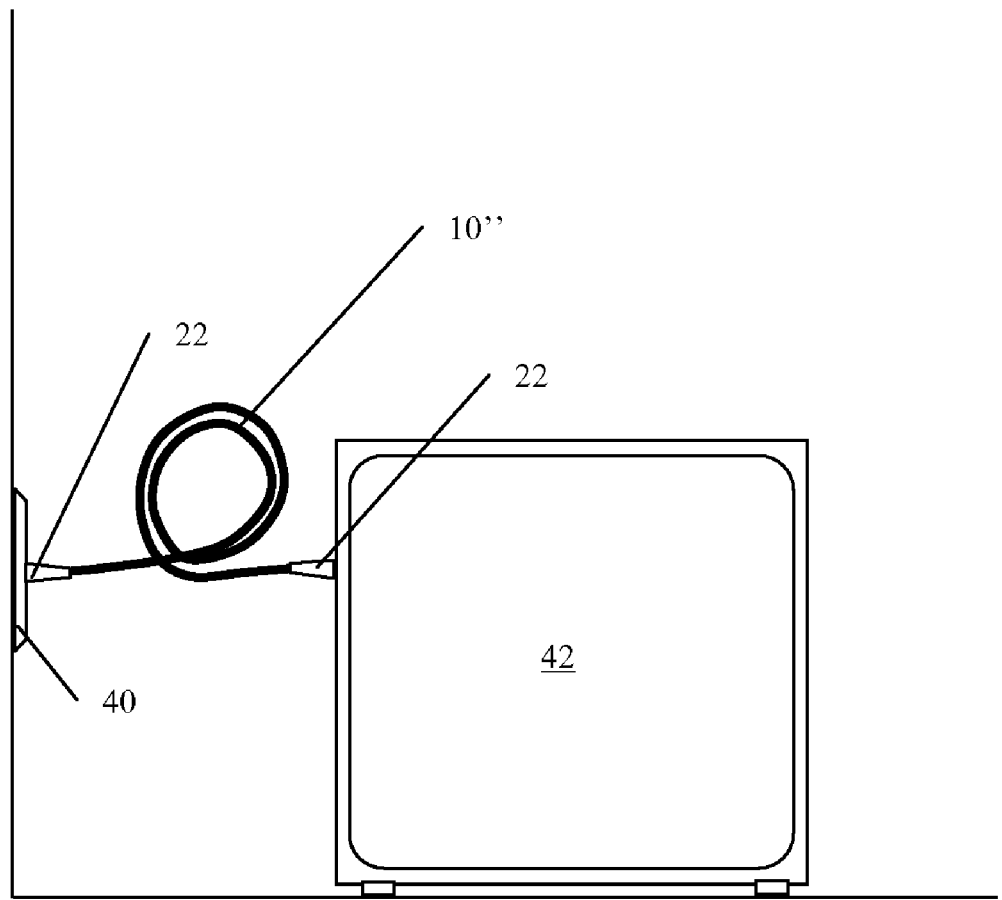
FIG. 3 illustrates the use of a shape-retaining fiber optic patchcord to interconnect a fiber optic transceiver unit to a network.

In a particular application, shape-retaining patchcords are provided in coiled form with a typical coil diameter of 100 to 150 mm and length of 1 to 5 meters. During use, one or both ends of the cable are uncoiled and straightened in a simple fashion by hand, without requiring tools. In this manner, a cable with the required length is provided, while excess lengths are retained in a confined loop for convenience and protection of the fiber. Such a patchcord may connect a fiber optic transceiver unit in a workstation 42 to the optical network drop cable terminated in wall interface plate 40, for example (FIG. 3). The shape-retaining optical patchcord provides a self-supporting and semi-rigid fiber loop that offers strain relief should the workstation 42 be moved. The ability to shape the cable and keep it elevated above the floor of an office, home or industrial facility is an advantage in providing optical cable connectivity to various communications equipment. The compliant element has sufficient strength-to-weight characteristics to enable the cable to be substantially self-supported under gravity when connector body 22 is secured to another mounted connector, such as that of the wallplate 40. Furthermore, by design the optical fiber 11 is substantially coaxial with the ductile cylinder 14-1, which helps to isolate the internal fiber 11 from damage due to crushing. The optical fiber 11 may in addition be surrounded by aramid fiber, such as Kevlar yard, to provide stress isolation.

Figure 4:
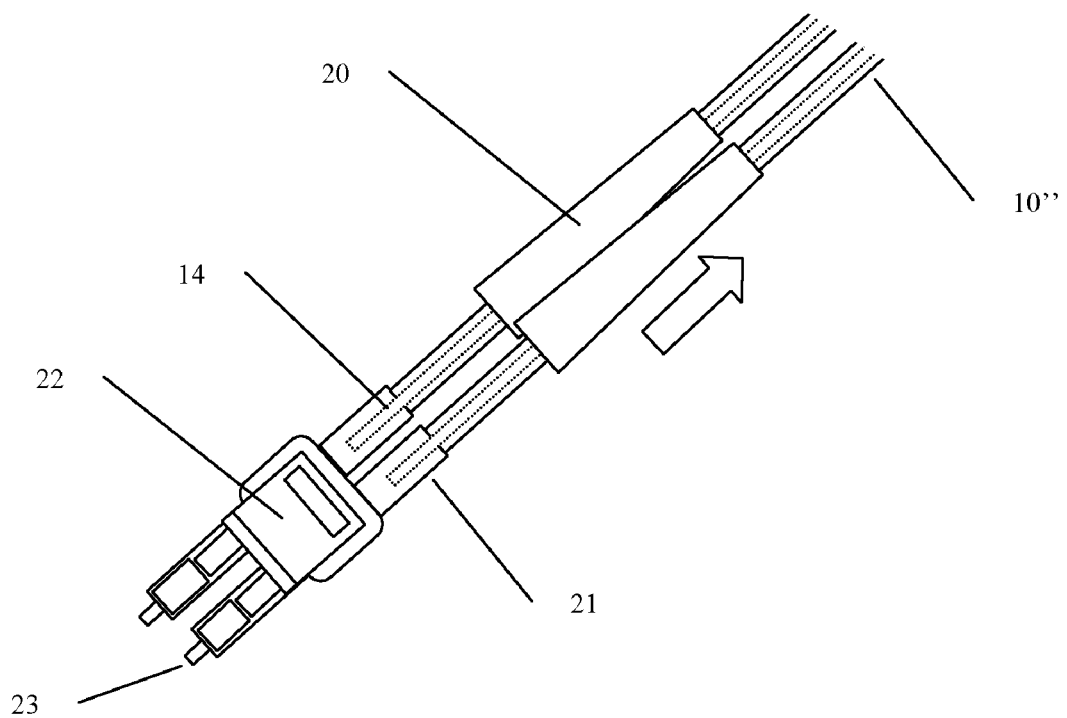
FIG. 4 illustrates the connectorized end of a shape-retaining, bend limited optical cable.

Shape-retaining patchcords require unique connectorization approaches to terminate the compliant member 14 in the fiber optic connector body 22. As illustrated in FIG. 4, where the strain relief boots 20 have been shifted for clarity as shown by the arrow from connector body 22, the fiber optic cables with compliant members 14 are inserted into crimp sleeves 21 which extend longitudinally from the rear of connector body 22. By compressing metallic sleeve 21 around the jacketed cable using a suitable plier-like crimp tool, the compliant member is permanently and rigidly affixed to connector body 22. The optical fibers are located and pass through the central bore of the compliant member 14 into the internal cavity of the connector body 22. The optical fibers at the connector are then terminated in polished connector ferrules 23 using an industry standard connectorization and polishing process.

Figure 5A:
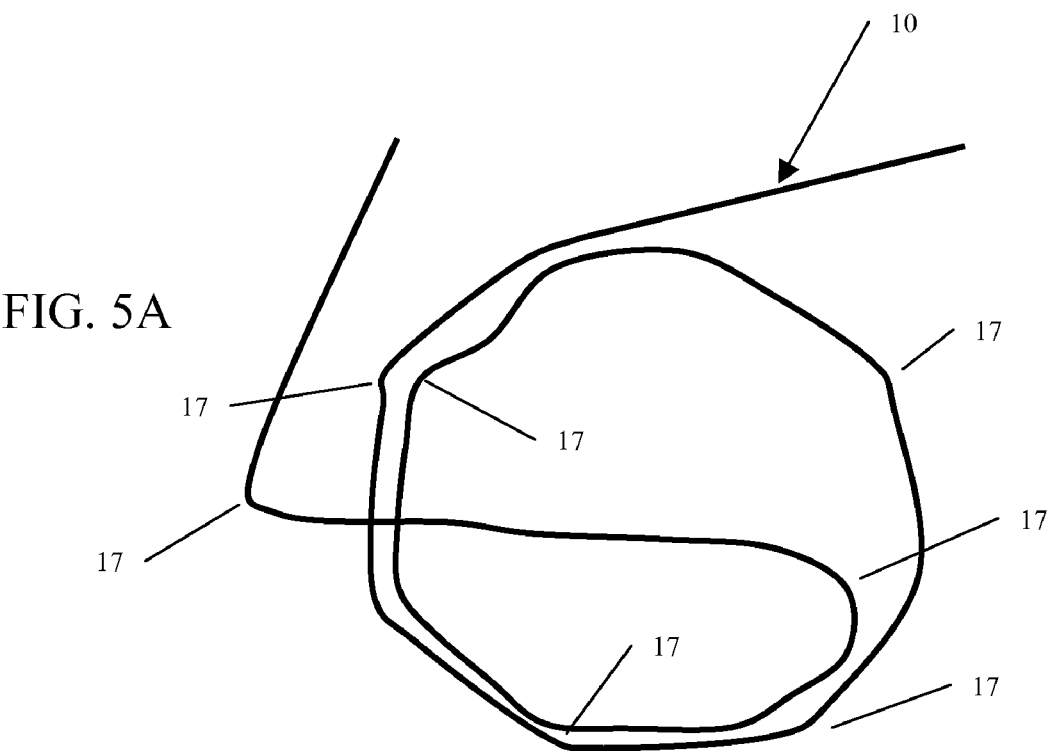
FIG. 5 schematically illustrates formed shape-retaining fiber optic patchcords, (A) without non-ductile bend limiting element(s) and (B) with non-ductile bend limiting element(s)
Figure 5B:
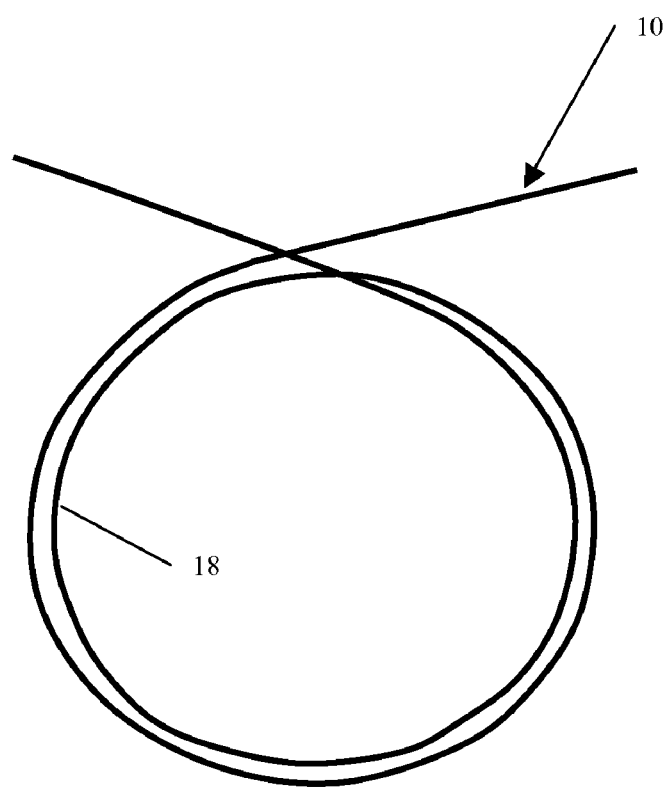

FIG. 5 contrasts two alternate designs of shape-retaining cables, both of which contain a ductile element 14-1, when manually bent to an arbitrary loop form. As illustrated in FIG. 5A, in the absence of the opposing and stiffness enhancing, non-ductile element 14-2, the cable tends to kink when manipulated by hand and when formed by the user into a desired shape. The highly ductile nature of the insert does not resist sharp bends. As a result, the cable kinks at multiple locations 17 as it is bent, the kinks corresponding to those points along the longitudinal extent of the cable in which the local radius of curvature is less than the minimum acceptable bend radius.

In accordance with the invention, the addition of a non-ductile element 14-2 of suitable stiffness to the cable structure (FIG. 5B) opposes the sharp bends and ensures consistent and kink-free loops 18 with acceptable bend radius. The cable still retains the impressed shape, with the exception that those bends which are excessively sharp are automatically and intrinsically rounded out to a radius dictated by the particular cable design.

Design Methodology

In accordance with the invention, the design of shape-retaining cables with defined minimum bend radius requires a selection of appropriate cross sections, dimensions and materials of elements. As is known in the art, the bending characteristics of the ductile and non-ductile elements may be estimated from the calculated moment of inertia of the particular element cross section to determine its mechanical stiffness. For a beam with cylindrical cross section of outer radius R and inner radius r, the elastic stiffness may be calculated by determining the moment of inertia I of this particular cross section:

$$I = \frac{\pi}{4}(R^4 - r^4). \quad (1)$$

The stiffness of a cylindrical beam is proportional to $I E_s$, where $E_s$ is Young's modulus of elasticity. In addition, from beam theory, the maximum bending stress of a rod or cylinder of maximum radius $\bar{r}$ is:

$$\sigma = E_s \frac{\bar{r}}{r_c} \quad (2)$$

where $r_c$ is the local radius of curvature. The calculation of an average bending stress and its comparision to the material yield stress for the beam will dictate whether the bending lies in the elastic or inelastic deformation regime.

The moment required to bend a straight, longitudinally extended cylindrical beam supported at one end and thereby producing a local radius of curvature $r_c$ is:

$$M = \frac{\pi}{4} \frac{E_s}{r_c} (R^4 - r^4), \quad (3)$$

where the moment M is equal to the product of an applied bending force and the distance from the support point of the beam to the point on the beam at which the force is applied. The moment required to bend a non-ductile element to a minimum specified bend radius is calculated from Equation (3). The non-ductile element has sufficient rigidity (e.g., metal elements are typically spring tempered or full-hard annealed) so it will spring-back to its original form, either straight or weakly coiled, in the absence of an applied moment. This assumes the stress on the non-ductile element is less than its yield strength, a requirement met by use of spring-tempered or hardened metals or rigid composites based on carbon fiber or polymers, for example. The tendency of the non-ductile element to resist sharp bends limits the minimum bend radius of the cable.

The ductile element is designed to produce a bending moment or local force along the longitudinal extent of the cable which is adequate to ensure that the non-ductile element retains its radiused form. For the ductile element to retain a static shape, it must produce a local force distribution equal and opposite to the local force distribution of the non-ductile element. The induced bend radius of the ductile element resulting from this force is calculated from Equation (3). To hold this radius, it is further required that the average bending stress on the ductile element, estimated from the bend radius using Equation (2), be less than the yield stress of the ductile element.

Figure 6:
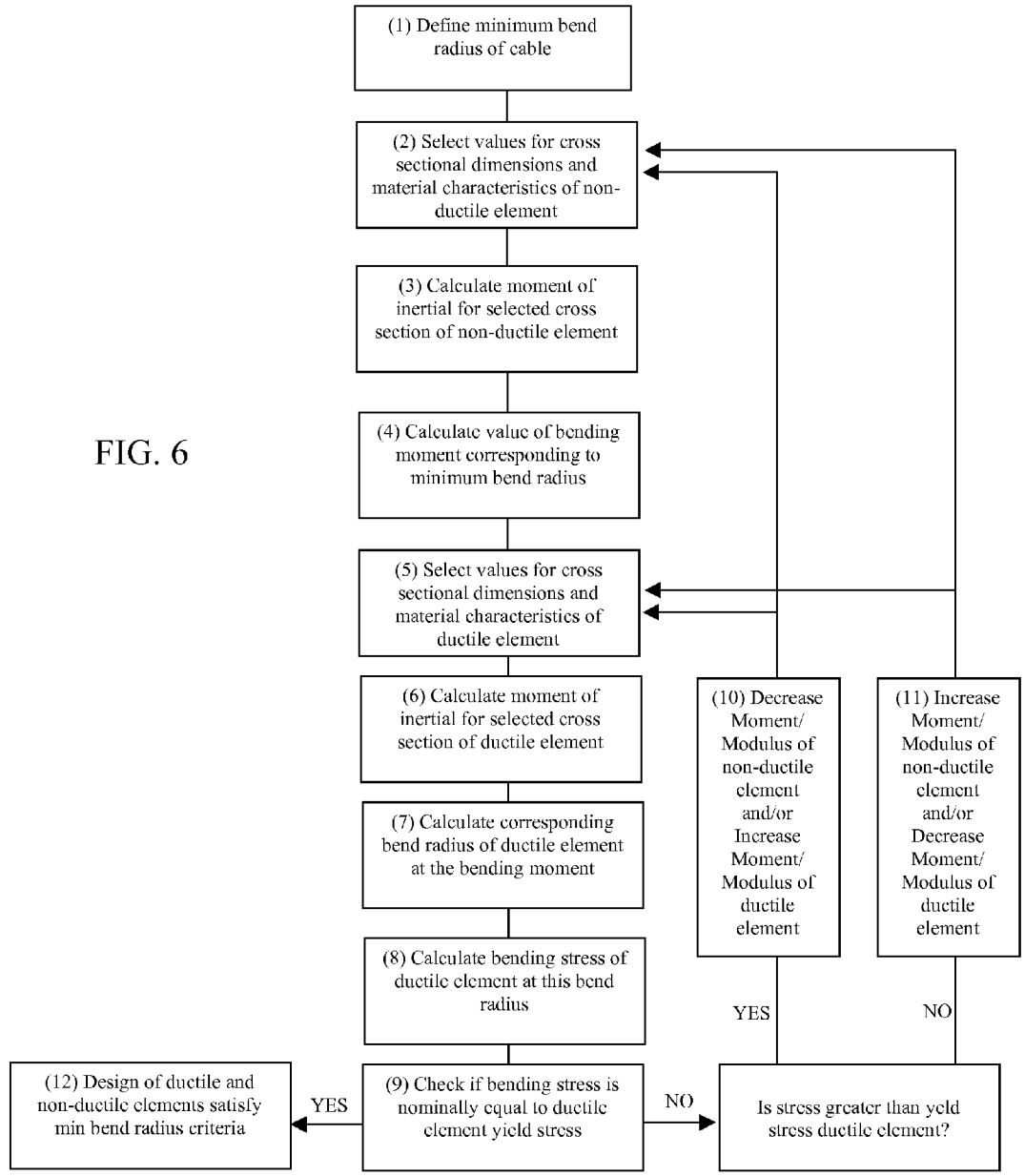
FIG. 6 is a flow chart illustrating the cable design methodology in accordance with this invention.

The design process for the compliant member 14 follows a methodology which produces the desired cable bending characteristics by iteratively adjusting characteristics of the ductile and non-ductile elements until a self-consistent solution with desired properties is obtained. FIG. 6 diagrammatically illustrates the design steps for a compliant member comprised of complementary ductile and non-ductile elements. In step 1, a minimum acceptable bend radius is provided as an input parameter. This minimum bend radius is dictated by the particular requirements of the optical fiber type, as well as its jacket or buffer diameters. The stresses on optical fiber under bending must be limited to prevent crack formation of the glass element. For example, typical unjacketed optical fiber has a minimum bend radius of 2.5 cm, while typical jacketed optical fiber has a minimum bend radius of 3.7 cm. Alternately, specialty bend insensitive fiber and reduced diameter cladding fiber can accommodate a bend radius as small as 5 mm without exhibiting long term, stress induced crack formation.

In step 2, preliminary values for the cross sectional dimensions and materials are estimated and Young's modulus of elasticity of the non-ductile material is provided. These may be initial targets based on the desired diameter of the finished cable, which can be refined later by use of an iterative approach, as described in subsequent step 9. Using the target values, the moment of inertia for the non-ductile element is calculated in step 3 using Equation (1), from which the bending characteristics of this particular cross section are estimated. In step 4, the value of the bending moment corresponding to the minimum bend radius is calculated for the non-ductile element using Equation (3), for the cross section selected in step 3.

In step 5, initial values for the cross sectional dimensions and materials, including Young's modulus of the ductile material, are selected. These initial values may require updating through an iterative approach, as outlined in step 9. In step 6, the moment of inertia for the ductile element is calculated using these initial values. In step 7, the bend radius of the ductile element produced by the bending moment of the non-ductile element is estimated using Equation (3) and the value of moment of inertia calculated in step 6. In step 8, the maximum stress of the ductile element at the calculated bend radius of the ductile element is calculated.

In step 9, the stress on the ductile element is compared to the ductile material's inherent yield stress. The value will fall within one of three ranges: First, if the stresses are nominally equal, the design of the ductile and non-ductile elements are satisfactory because the retained cable shape can not maintain a radius of curvature less than the predefined value. Note that the yielding of the ductile element may be best represented by an average stress rather than the maximum stress, so it may be acceptable for the maximum stress to be slightly larger than the inherent material yield stress.

Second, if the calculated stress is less than the yield stress (step 10), it is possible to form the cable with a radius of curvature tighter than the minimum bend radius, which contradicts the original design requirement. This therefore requires that the moment/modulus of the ductile element be decreased, and/or the moment/modulus of the non-ductile element be increased. Some design parameters may be changed based on this result in steps 2 and 5, and thereafter the iterative process is repeated.

Third, if the calculated stress is more than the yield stress (step 11), the cable is unable to retain a bend with radius of curvature as small as the target minimum bend radius. Therefore, the cable can not be coiled with sufficiently small coil diameter. To correct this situation, the moment/modulus of the ductile element may be increased, and/or the moment/modulus of the non-ductile element may be decreased. Design parameters may be changed in steps 2 and 5, and thereafter the iterative process is repeated. The bending stress is again compared to the yield stress of the ductile element. Once the selected parameters lead to a self-consistent solution for the bending stress, the design process is complete.

Note that the cross sectional dimensions of the non-ductile element can not be made arbitrarily small, because this will reduce its stiffness and make it possible to excessively bend the element and exceed its yield stress while shaping the cable. The cable should be able to withstand applied torques of up to about 0.5 kg-cm without bending excessively. For this reason, it is preferred to utilize spring-tempered material which exhibits relatively high yield strength and resists over bending under typical applied forces. The dimensions of the non-ductile element are typically greater than 0.5 mm in diameter, preferentially in the vicinity of 0.75 mm diameter, for a non-ductile element of circular cross section. This provides a restoring force that effectively compensates the bending force applied by a typical user under typical use conditions.

Figure 7A:
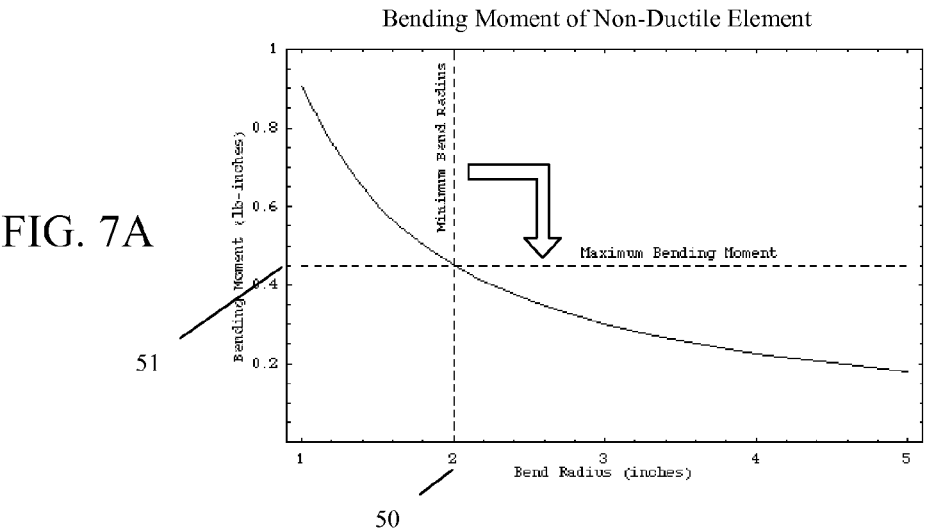
FIG. 7 presents calculations and stress relationships of an example shape-retaining member.
Figure 7B:
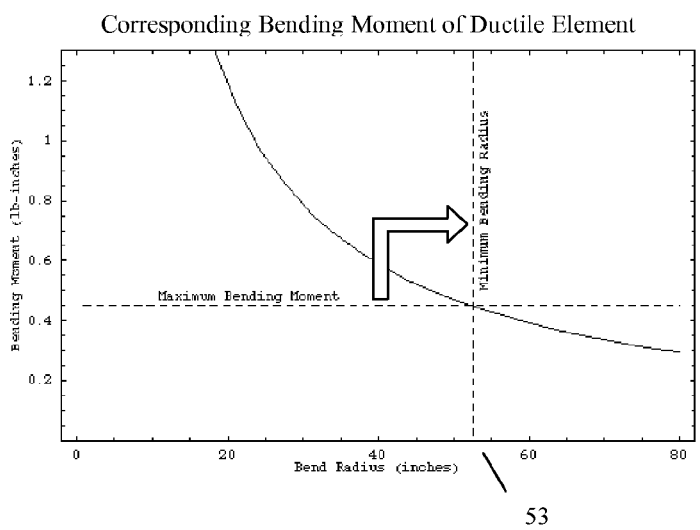
Figure 7C:
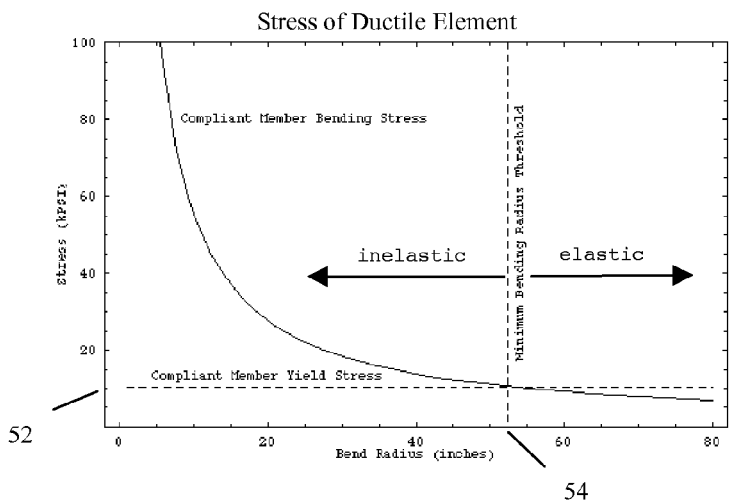

FIGS. 7A-7C are a series of calculation results for a particular cable design example in accordance with the methodology outlined in FIG. 6. The ductile element 14-1 is a soft annealed copper tube with outer diameter of 2 mm and inner diameter of 1.25 mm, and the non-ductile element 14-2 is spring tempered 1075, 1085, or 1095 carbon steel of 0.787 mm diameter. FIG. 7A plots the calculation results of bending moment for the non-ductile element as a function of bend radius. These results are utilized in step 3, wherein the maximum bending moment 51 corresponding to desired minimum bend radius 50 is calculated. FIG. 7B plots the calculation results of bending moment for the non-ductile element as a function of bend radius. These results are utilized in step 7, wherein the bend radius 53 of the ductile element induced by the moment 51 of the non-ductile element is determined. To determine whether this cable shape is substantially retained, as in step 10, the maximum stress 52 of ductile element having this induced bend radius 53 is calculated. FIG. 7C plots the maximum stress 52 of the ductile element as a function of bend radius. In this calculation, since the local stress 52 corresponds to that stress produced by a local radius of curvature equal to the bending radius threshold 54 of 52.5 inches, the shape of the bend is retained and the minimum bend radius of 2 inches is achieved. The relationships illustrated graphically in FIG. 7A-7C present the interrelations and dependencies of the minimum bend radius on various force and stress considerations To summarize the design methodology, the minimum bend radius 50 is first defined, whereby the corresponding bending moment 51 required to produce this radius in the non-ductile member is determined (FIG. 7A). The effect of this maximum bending moment 51 on the ductile member is plotted in FIG. 7B, wherein the bend radius induced on the ductile member is then estimated. Thereafter, in FIG. 7C the stress level 52 produced by this degree of bending is compared to the yield point of the ductile member. For bend radii less than the minimum bending radius threshold 54, the ductile member deforms inelastically and takes a new shape which reduces the radius of curvature. For radii greater than the minimum bend radius threshold 54, the ductile element substantially retains the bent form.

EXAMPLE

Simplex Fiber Optic Cables

Figure 8A:
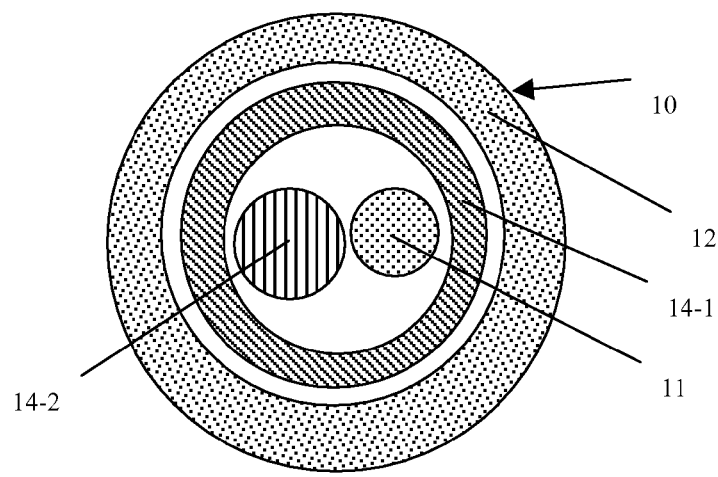
FIG. 8 illustrates additional cross sectional views of shape-retaining cables including ductile and non-ductile elements.
Figure 8B:
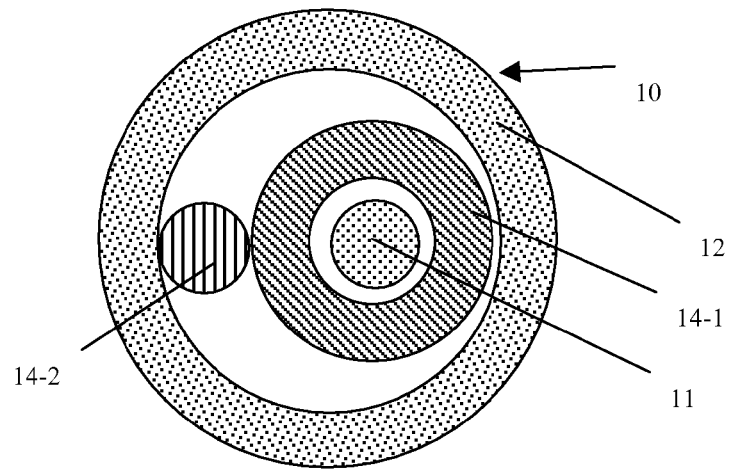
Figure 8C:
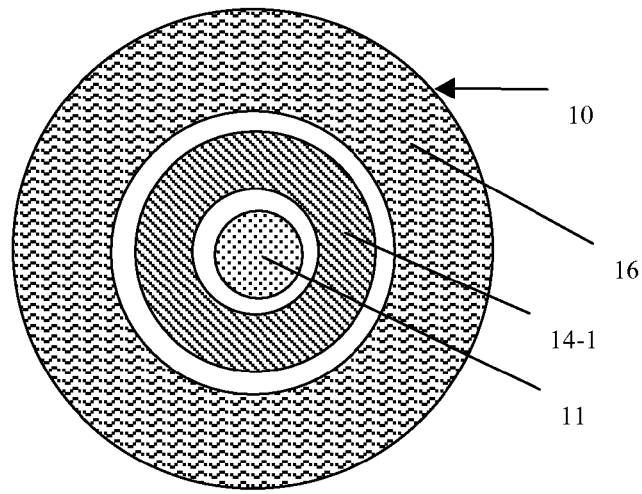

Shape retaining fiber optic cables can be provided with a variety of fiber optic cable types, such as simplex, duplex, multi-fiber or ribbon cable. Cross sectional views of various simplex-type shape-retaining patchcords are shown in FIG. 8. In the example of FIG. 8A, the optical fiber 11 and non-ductile element 14-2 are surrounded by and substantially coaxial with a cylindrical ductile element 14-1. This ductile element 14-1 is jacketed along its longitudinal extent within a flexible plastic 12 sheath. This sheath 12 may be provided in the form of a tube, or may be extruded or coated directly onto ductile element 14-1. In an alternate example, the non-ductile wire 14-2 may be placed within plastic jacket 12 but outside of ductile cylinder 14-1 (FIG. 8B). Alternately, as illustrated in FIG. 8C, the non-ductile element 14-2 may be in the form of an outer bend limiting tube 16 that surrounds both the ductile element 14-1 and optical fiber 11.

Figure 9:
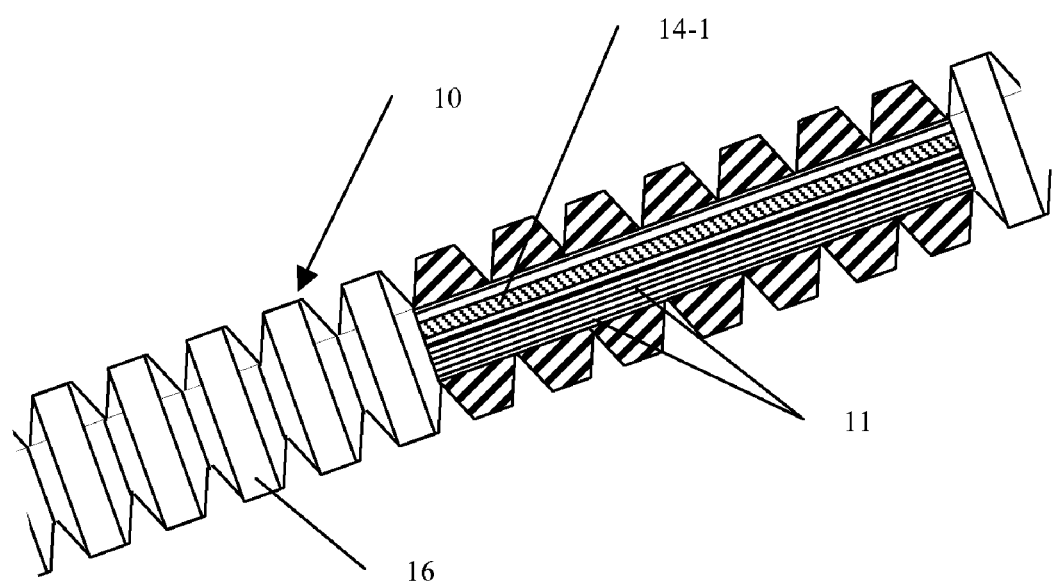
FIG. 9 shows a cutaway view of a shape-retaining fiber optic cable implementation in which a non-ductile bend-limiting tube serves as the cable jacket.

An example of a bend limiting tube 16 serving as an outer fiber optic cable jacket has been disclosed in PCT Publication No. WO 2006/035206A1 by Jenkins et al. This plastic jacket is in the form of a tube 16 with circumferential grooves that limit the bend radius of the cable to a pre-specified value. In this structure, the restriction on bending is a result of the physical geometry of the grooved tube, and is not dependent on stress build-up within the non-ductile element. Typically, the bend limiting tube is fabricated of plastic with outer diameter of 2 mm to 10 mm. A typical minimum bend radius for jacketed fiber optic cable is 32 mm. Such a cable, shown in cross section in FIG. 8C, is illustrated in partial cutaway view in FIG. 9. This or related implementations of a bend limited tube are alternate approaches which equivalently function as the non-ductile element 14-2.

The minimum fiber bend radius is 25 mm for unjacketed cables consisting of Corning SMF-28 fiber or its equivalents. In implementations with Corning Flex 1060 single mode bend insensitive fiber, the radius can be reduced to 10 mm. Cable manufacturers specify the minimum bend radius for cables under tension and long-term installation. The ANSI TIA/EIA-568B.3 standard specifies a bend radius of 25 mm under no pull load and 50 mm when subject to tensile loading up to the rated limit. Cables comprised of special bend insensitive fiber such as Corning Flex 1060, Lucent D5, Nufern 1550B-HP, or Sumitomo Pure Access or Pure Access-Ultra can withstand a bend radius of 7.5 to 10 mm without exhibiting increased insertion loss or mechanical failure. This is achieved by increasing the numerical aperture of the fiber to increase the guiding characteristics, and in some cases, by reducing the outer diameter of the cladding from 125 μm to 80 μm. Alternately, the constituent fibers making up the cable may include one or more strands of single mode (SM), multimode (MM), dispersion shifted (DS), non-zero dispersion shifted (NZDS), polarization maintaining (PM), photonic crystal (PC) or plastic optical fiber (POF). The typical wavelengths of operation for telecommunications applications include 850 nm, 1310 nm and 1550 nm (S, C, and L bands). The outer diameter of the bare fiber may be 80, 125, or 200 μm with an acrylate coating of 250 μm diameter, for example. The shape-retaining cable may further include a variety of different fiber types fusion spliced together to form a continuous length of fiber.

Various types of protective jacketing can be incorporated into the shape-retaining, bend-limited cable disclosed herein, such as jacketed optical fiber with 3, 2.9, 2, 1.8 or 1.6 mm outer diameters, containing coated optical fiber of 0.25 to 0.5 mm diameter or tight buffered fiber of 0.5 to 0.9 mm outer diameter. In addition, shape-retaining bend limited cable may incorporate fiber optic ribbon cables comprised of four or more individual fibers, for example.

The termination of shape-retaining, bend-limited fiber optic cables requires that the compliant member be attached in a semi-rigid fashion to the connector body(s) at the end(s) of the cable. Any of the numerous fiberoptic connector styles can be utilized, including industry standard FC, SC, ST, LC or MTRJ connectors.

EXAMPLE

Materials

Suitable materials for use as the ductile element include, but are not limited to, the class of malleable metals which are highly ductile and relatively immune to work-hardening.

Excessive work-hardening would potentially cause brittleness of the compliant material and lead to cracking and embrittlement over many cycles of cable shaping and reshaping. Optimal materials include soft annealed copper, brass, tin, aluminum or related alloys. In a particular example, the ductile element is comprised of soft annealed copper with 35,000 psi ultimate strength and 10,000 psi yield strength. In alternate examples, C260 (cartridge) brass with 47,900 psi ultimate strength and 16,000 psi yield strength or 1006-1008 series soft annealed steel may be utilized.

Materials suitable for the non-ductile element include, but are not limited to, the class of high strength, high carbon steel alloys. In a particular example, the non-compliant element is comprised of 1075-1095 series carbon steel spring tempered wire (piano or music wire) with up to 399,000 psi ultimate strength and 75,000 psi yield strength. Such metallic elements may be additionally treated with a phosphorus coating or galvanized to resist corrosion. Alternately, the non-ductile element is comprised of polymer materials such as composites with fiber reinforcement. The reinforcement materials include fiberglass with high strength (625-665 Kpsi) and high modulus of elasticity (12.6 Kpsi), or aramid fiber with higher modulus of elasticity (11.5-27.0 Mpsi). Carbon or graphite fiber offers the highest strength (1050 Kpsi) and the highest modulus (33-120 Mpsi) reinforcement. Alternately, PEEK plastic or equivalents also provide sufficient rigidity while having the advantage of reduced weight.

Those skilled in the art will readily observe that numerous modifications and alterations of the cable structure may be made while retaining the teachings of the invention. Accordingly, the above disclosure should be construed as limited only by the metes and bounds of the appended claims.

What is claimed is:

1. An elongated fiber optic conduit structure which can be multiply shaped to follow a desired path while maintaining a minimum bend radius, comprising:
    an elongated jacket for confining at least two extended members, the jacket having a longitudinally pliant body with limited radial expandability;
    a fiber optic conduit disposed within and along the jacket, the conduit having a low structural rigidity but required to have more than at least a minimum bending radius;
    a first elongated structural member disposed within and extending along the jacket, said member being of ductile material which yields under a predetermined force;
    a second elongated structural member disposed within and along the jacket, the second adjacent the first structural member, the second member being non-ductile and producing a force when subjected to the minimum bend radius that is nominally equal to the predetermined force which can be sustained by the first structural member without yielding, and
    the first and second structural members being juxtaposed within the jacket to provide a combinatorial response to curvature such that the fiber optic conduit system opposes shaping to less than the minimum bend radius.

2. An elongated fiber optic conduit structure in accordance with claim 1 above, wherein the structure can be subsequently re-shaped to follow and retain an alternate path while maintaining a minimum bend radius.

3. A fiber optic conduit structure as set forth in claim 1 above, wherein the first structural element is hollow and the second structural element and the said conduit are disposed therewithin.

4. A fiber optic conduit structure as set forth in claim 1 above, wherein the first structural element is hollow and within said jacket and the conduit is disposed within the first structural element and the second structural element is within the jacket external to the first structural element.

5. A fiber optic conduit structure as set forth in claim 1 above, wherein the conduit structure comprises paired structures with longitudinally adjoining jackets.

6. A fiber optic conduit structure as set forth in claim 1 above, wherein the first structural element defines the jacket and includes a central bore encompassing the second structural element and the conduit.

7. A fiber optic conduit structure as set forth in claim 1 above, wherein the jacket has bend-limited compliance, and wherein the second structural member and conduit are within the jacket, and is in longitudinal physical engagement with the jacket.

8. A structure in accordance with claim 1, wherein the fiber optic conduit is comprised of one or more optical fibers selected from the class of fibers including single mode, multimode, dispersion compensating, bend-insensitive, high numerical aperture, photonic crystal and plastic optical fibers.

9. A structure in accordance with claim 8, wherein the optical fibers are fabricated of fused silica with an outer diameter of 125 to 250 microns with a protective coating of 250 to 900 microns.

10. A structure in accordance with claim 1, wherein the first elongated structural member is soft annealed copper, cylindrical in cross section with an outer diameter of 1.5 to 2.0 mm, an inner diameter of 1 to 1.5 mm, and wherein the second elongated structural member is spring steel, circular in cross section with a diameter of 0.5 to 1 mm.

11. A fiber optic structure shapeable to a selected longitudinal configuration that is limited to a minimum bending radius, comprising, in combination,
    first and second elongated members in proximate lengthwise relation, a first of the members having an elastic bending response when bent to a radius of curvature lateral to its longitudinal extent, the first member exerting a lateral force inversely related to the imposed bending radius, the second member, being pliant laterally with an inelastic response of predetermined magnitude to bending force, said predetermined force response being greater than the lateral force of the first member until the structure is shaped to a radius of curvature along its longitudinal extent equal to the minimum bending radius, the lateral force of the second member being in opposition to the lateral force of the first member,
    a fiber optic conduit transversely adjacent the first and second members, and bendable therewith and
    an element enclosing the first and second members and the conduit to maintain the physical proximity therebetween, such that there is lateral force interaction between the first and second members when bent, wherein the first member is non-ductile with substantially circular cross sections of 0.5 to 1 mm in diameter, and the second member is ductile with substantially cylindrical cross sections with 1 to 1.5 mm inner diameter and 1.5 to 2.0mm outer diameter.

12. A cable in accordance with claim 11 wherein the limited bend radius is about 37 mm or more.

13. A flexible, fiber optic interconnection cable including one or more optical fibers and separate, longitudinally adjacent first and second laterally bendable elements and an element maintaining said elements in transverse proximity and bendable together along their lengths, wherein, under an applied bending force, the first bendable element exerts a responsive spring force in opposition and the second bendable element physically deforms under the applied bending force to the new shape, the second bendable element being of a ductile material and stiffness to provide a holding force opposing the spring force produced by the first bendable element to substantially maintain any new shape having greater than a predetermined minimum bend radius, wherein the interconnection cable further includes ends which are terminated in polished fiber optic connectors including a rigid connector body, having a rigid, longitudinally extended support incorporated therein, the first bendable element being inserted therein to allow optical fibers to pass longitudinally therein, the support preventing excessive bending at the insertion point of the cable into the connector body.

14. A structure in accordance with claim 11, wherein the first member is substantially comprised of a first material and the second member is substantially comprised of a dissimilar, second material, the first material characterized by a yield strength greater than that of the second material, wherein the first material is high carbon steel or a carbon fiber composite, and the second material is soft annealed copper, tin, brass, aluminum or low carbon steel.

15. A flexible, fiber optic interconnection cable as set forth in claim 13, wherein the responses of the first and second elements are selected to maintain a bend radius greater than 37 mm under an applied bending moment of less than 0.5 kg-cm.

* * * * *